3,689,215
METHOD FOR REMOVING COLOR FORMING IMPURITIES FROM HYDROCYANIC ACID
Robert B. Green, Athens, Ohio, and Raymond A. Newsom and Gene L. Tromblee, Dickinson, Tex., assignors to Monsanto Company, St. Louis, Mo.
No Drawing. Filed Nov. 24, 1970, Ser. No. 92,506
Int. Cl. C01c 3/04, 3/06, 121/30
U.S. Cl. 423—379
6 Claims

ABSTRACT OF THE DISCLOSURE

Adding at least about 0.005 percent by weight of sulfuric acid to impure hydrocyanic acid, mixing said sulfuric acid and said impure hydrocyanic acid together and separating from said mixture water-white hydrocyanic acid results in water-white hydrocyanic acid even when stabilized with sulfuric acid to prevent polymer formation. The method is especially useful for removing color-forming impurities from hydrocyanic acid made as a by-product of the manufacture of unsaturated nitriles by oxidative synthesis from an olefin and ammonia.

BACKGROUND OF THE INVENTION

This invention relates to hydrocyanic acid. More particularly, it relates to the purification of hydrocyanic acid.

Hydrocyanic acid is an article of commerce which may be synthesized from ammonia and methane. A highly relative material, hydrocyanic acid will polymerize rapidly at higher pH levels. Since this polymerization can take place with almost explosive force, it has been customary to stabilize hydrocyanic acid with small amounts of sulfuric acid. After the addition of sulfuric acid, hydrocyanic acid, when handled with normal care, may be shipped, stored and used without difficulty.

However, from time to time the color of the hydrocyanic acid, even after sulfuric acid has been added as a stabilizer, will darken. Experience has shown that usually such appearance of color in the stabilized acid indicates the beginning of polymerization. Since polymerization of hydrocyanic acid can accelerate at a rapid rate, prudent materials handling practice dictates rapid disposal of the dark colored acid to avoid a dangerous safety hazard. Accordingly, the monitoring of the color of sulfuric acid stabilized hydrocyanic acid has become a critical quality control measurement. Hydrocyanic acid to be used in the normal channels of commerce therefore must be supplied with an initial water-white color, i.e., a color of less than 10 on the APHA color scale in order that there be no interference with this important quality control tool.

With increased volume of production of acrylonitrile from propylene and ammonia, large volumes of hydrocyanic acid are being produced as a by-product. Because of the differences in raw materials, reaction conditions, and resultant reaction products, the by-product hydrocyanic acid contains different impurities than synthesized hydrocyanic acid. The difference in impurities is particularly evident when sulfuric acid is added as stabilizer. Whereas the color of synthesized hydrocyanic acid usually remains water-white after the addition of sulfuric acid as an inhibitor, the color of by-product hydrocyanic acid immediately turns dark causing the hydrocyanic acid to fall below commercially recognized quality standards. Attempts to remove the impurities by normal distillation methods prior to the inhibitor addition failed to improve the hydrocyanic acid product color. Apparently the impurities boil at a temperature so close to hydrocyanic acid that distillation is not a commercially practicable solution to the problem. Use of different acids which do not form the color-bodies is, likewise, not a practical alternative since commercial uses are based on the sulfuric acid inhibited hydrocyanic acid. A different inhibitor would require segregated storage facilities which would limit flexibility of operation. Thus, there is a recognized industry need for a method of inhibiting by-product hydrocyanic acid with sulfuric acid without the formation of color bodies.

SUMMARY OF THE INVENTION

The process of this invention comprises adding at least about 0.005 percent by weight of sulfuric acid to impure hydrocyanic acid, mixing said sulfuric acid and said impure hydrocyanic acid together and separating from said mixture water-white hydrocyanic acid. The acid can then be re-acidified with sulfuric acid without discoloration.

DETAILED DESCRIPTION

It is postulated that when sulfuric acid is added to by-product hydrocyanic acid a reaction takes place with or among impurities in the by-product hydrocyanic acid. Since such impurities are extremely difficult to isolate from the by-product hydrocyanic acid, they are not presently identified. However, evidence of the reaction is found in the color change noted in the by-product hydrocyanic acid upon addition of sulfuric acid. Such color may be measured on the APHA scale and may be found to give a reading of 50 or more. It has been found in the present invention that the reaction products of the reaction which occurs upon addition of sulfuric acid with or among impurities found in by-product hydrocyanic acid are sufficiently stable that they may be separated by distillation from the product hydrocyanic acid. Separation of such impurity reaction products from the hydrocyanic acid gives a water-white product, i.e., a product having a color reading of less than 10 on the APHA scale, even after re-acidifying with sulfuric acid.

Sulfuric acid utilized in the present invention may be of any desired concentration readily available. The concentration of the sulfuric acid is not critical. However, it is necessary that the amount of $H_2SO_4$ added to the hydrocyanic acid be at least about 0.005 percent by weight of the impure hydrocyanic acid stream to ensure sufficient $H_2SO_4$ to react with or cause reaction of all the impurities present which will react with $H_2SO_4$. In hydrocyanic acid streams having high levels of impurities it is preferred to add about 0.01 percent by weight sulfuric acid and more preferred to add about 0.02 percent by weight sulfuric acid. Although any amount of sulfuric acid may be added to obtain the reaction of the color-forming impurities, a run-away exothermic reaction can occur if an excessive amount of $H_2SO_4$ is present in the HCN. This undesired $H_2SO_4$—HCN reaction gives ammonium bisulfate and formic acid as reaction products. Avoiding such explosive reaction conditions will normally place a maximum limit on the amount of sulfuric acid to be added. Thus, while as much as one percent by weight sulfuric acid may be added to the hydrocyanic acid, it is usually preferred to add no more than about 0.5 percent by weight of sulfuric acid and more preferred to add no more than about 0.1 percent by weight. In a particularly preferred embodiment from about 0.025 to about 0.035 percent by weight sulfuric acid is added to the impure by-product hydrocyanic acid.

Impure hydrocyanice acid is usually produced as a by-product of the oxidative synthesis of an unsaturated aliphatic nitrile from an olefin and ammonia such as acrylonitrile from propylene and ammonia or of methacrylonitrile from butylenes and ammonia or similar reactions. While the present invention may be used in the purification of any impure streams of hydrocyanic acid produced by any process so long as the streams have impurities which upon addition of sulfuric acid react to form color-bodies, such impure streams normally are produced by the above described oxidative syntheses. Thus, the process of the present invention will usually be practiced on by-product hydrocyanic acid.

Color-bodies will usually form immediately upon contact between the sulfuric acid and the impure hydrocyanic acid. It may be preferred to heat the mixture above 20 degrees centigrade to assure complete reaction between the sulfuric acid and the color-forming impurities. Likewise, it may be desired to agitate the mixture to assure uniform distribution of the sulfuric acid and opportunity for reaction of all color-forming impurities with the sulfuric acid. When distillation is chosen as the method for separating the color-bodies from the hydrocyanic acid, no additional mixing or agitation is required. The contact between the sulfuric acid and the impure hydrocyanic acid during distillation is sufficient to assure complete reaction of all color-formers without additional agitation or standing. It may, at times, be desirable to allow the mixture to stand for a period of time to allow the reaction to go to completion. From about 30 to about 45 minutes appears to be adequate time for the reaction to reach completion at ambient room temperature. Said standing period may be utilized after agitation and/or heat or in lieu of either or both.

Separation may be accomplished by any known method. Separation by distillation is preferred. Distillation provides the necessary heat and contact to assure complete reaction between the sulfuric acid and the color-forming impurities while performing the desired separation. Flash distillation is more preferred since it provides fast, efficient separation of the water-white hydrocyanic acid from the color-bodies which are reaction products of sulfuric acid and color-forming impurities, sulfuric acid and other heavy ends. The HCN is taken overhead from the distillation vessel as a gas, condensed, and stabilized with from about 0.1 to about 0.3 percent by weight sulfuric acid to prevent formation of HCN polymer. Preferably from about 90 to about 99.6 percent by weight of the charge to the distillation apparatus is taken overhead to make an adequate separation. More preferably about 99 percent by weight of the charge is taken overhead as product for most efficient plant practice. Limitations on the maximum amount taken overhead are the color of the overhead product which increases as a higher percentage is taken overhead and the composition of the remaining bottoms. As the percentage of the charge taken overhead increases the sulfuric acid concentration in the bottoms remaining increases. Thus to avoid a runaway exothermic reaction between sulfuric and hydrocyanic acids in the bottoms no more than 99.6% of the charge should be taken overhead if 0.03% by weight sulfuric acid is added to the impure hydrocyanic acid. Of course the maximum percentage to be taken overhead will vary with the amount of sulfuric acid initially added. The percentage amount of sulfuric acid remaining in the bottoms of the still at various levels of distillation have been calculated based upon a 0.03 percent by weight addition of sulfuric acid to the impure hydrocyanic acid and are presented below. Similar calculations may be made for other levels of sulfuric acid addition in order to determine maximum percent overhead taken to avoid runaway reaction conditions in the bottoms remaining. The concentration of sulfuric acid where this occurs is not clearly established but is believed to be in the 50 to 60 percent by weight range. It is preferred that the sulfuric acid concentration of the bottoms never exceeds 10 percent by weight. This can be accomplished by either establishing first the desired level of HCN product to be recovered as overhead product and then adding to the total charge to the column a calculated quantity of sulfuric acid such that sulfuric acid does not exceed 10 percent by weight of the residue HCN or column bottoms, or by establishing first the desired level of sulfuric acid to be added to the total charge to the column and then taking a calculated level of recovered HCN product as column overhead such that sulfuric acid does not exceed 10 percent by weight of the residue HCN or column bottoms. Where conditions warrant a higher or lower level of sulfuric acid in the residue HCN or column bottoms, similar calculations can be used to determine either the appropriate amount of sulfuric acid to be added to the column feed or the proper level of recovered HCN product taken as column overhead.

| Bottoms, percent of total charge: | $H_2SO_4$ percent of bottoms |
|---|---|
| 100 | 0.03 |
| 80 | 0.038 |
| 50 | 0.06 |
| 20 | 0.15 |
| 10 | 0.30 |
| 5 | 0.60 |
| 2.5 | 1.20 |
| 1.0 | 3.00 |
| 0.75 | 3.99 |
| 0.40 | 7.50 |
| 0.20 | 15.0 |
| 0.10 | 30.0 |
| 0.05 | 60.0 |

A minimum limitation on the amount taken overhead results from economic considerations. Sufficient product should be taken overhead to avoid excessive material losses.

To further describe the preferred embodiments of the present invention, the following examples are presented.

EXAMPLE 1

This example illustrates the low color level of impure hydrocyanic acid stabilized with sulfuric acid after treatment by the process of this invention.

A 400 milliliter sample of by-product HCN taken from an acrylonitrile manufacturing unit is divided into two portions. Both portions are distilled using a distillation column 25 millimeters in diameter and 75 centimeters in length packed with 2 millimeter glass heads using a 1:1 reflux ratio. Five 30 milliliter quantities are collected from the distillation of the first portion. To the second portion 0.045 gram of sulfuric acid is added 45 minutes prior to distillation. Again five 30 milliliter quantities are collected from the distillation. To each of the fractions collected from the distillations and the material remaining in the distillation flasks 0.04 gram of sulfuric acid is added to inhibit polymerization. The inhibited fractions are allowed to stand overnight and then compared with APHA color standards.

| Portion A sample | APHA color | Portion B sample | APHA color |
|---|---|---|---|
| Fraction: | | Fraction: | |
| 1 | >50 | 1 | <10 |
| 2 | >50 | 2 | <10 |
| 3 | >50 | 3 | <10 |
| 4 | >50 | 4 | <10 |
| 5 | >50 | 5 | <10 |
| Flask residue | >50 | Flask residue | ≫50 |

The stabilized portions of hydrocyanic acid treated according to the process of this invention have a water-white color while the portions not so treated have an unacceptable color level when stabilized with sulfuric acid.

EXAMPLE 2

This example illustrates the excellent level of color stability of impure hydrocyanic acid treated by the process of this invention and then stabilized with sulfuric acid.

To a 200 milliliter sample of by-product HCN, 0.041 gram of sulfuric acid is added. A visible coloration of the sample develops within 15 minutes. The sample is allowed to stand for 45 minutes and then is distilled in a simple distillation flask until approximately 20 milliliters of HCN remains in the bottom of the flask. This residue has an APHA color ≫50. The material which is collected from the distillation is inhibited by the addition of 0.2 gram of sulfuric acid. The sample is compared with APHA color standards after standing overnight and is found to have an APHA color of <10. The sample is sealed and allowed to stand for 2 weeks at room temperature. No color change is observed. Thus, treatment by the process of this invention is shown to give not only a low initial color to impure hydrocyanic acid when stabilized with sulfuric acid but also an excellent level of color stability even for an extended period after the stabilizer is added.

We claim:

1. A process for removing color-forming impurities from impure by-product hydrocyanic acid recovered from the oxidative synthesis of unsaturated nitriles from olefins and ammonia comprising adding from about 0.005 to about 1.0 percent by weight of sulfuric acid to said impure by-product hydrocyanic acid, mixing said sulfuric acid and said impure by-product hydrocyanic acid together and separating from said mixture water-white hydrocyanic acid.

2. The process of claim 1 wherein the water-white hydrocyanic acid is separated from said mixture by distillation.

3. The process of claim 2 wherein the distillation is flash distillation.

4. A process for removing color-forming impurities from impure liquid by-product hydrocyanic acid recovered from the oxidative synthesis of unsaturated nitriles from olefins and ammonia comprising adding from about 0.005 to about 1.0 percent by weight of sulfuric acid to said impure liquid by-product hydrocyanic acid in a distillation vessel and distilling from said vessel as a gas water-white hydrocyanic acid.

5. The process of claim 4 wherein the distillation is a flash distillation.

6. The process of claim 4 wherein from about 90 to about 99.6 percent by weight of the impure liquid hydrocyanic acid is taken overhead as gaseous water-white hydrocyanic acid.

References Cited

UNITED STATES PATENTS

| 3,305,308 | 2/1967 | Sennewald et al. | 23—151 |
| 3,357,900 | 12/1967 | Snell | 23—151 |
| 2,419,225 | 4/1947 | Mitchell et al. | 23—151 |

OSCAR R. VERTIZ, Primary Examiner

H. S. MILLER, Assistant Examiner